(12) United States Patent
Uskert

(10) Patent No.: US 9,354,103 B2
(45) Date of Patent: May 31, 2016

(54) LEVEL SENSING DEVICE

(71) Applicant: AAI Corporation, Hunt Valley, MD (US)

(72) Inventor: Richard Uskert, Timonium, MD (US)

(73) Assignee: AAI Corporation, Hunt Valley, MD (US)

(*) Notice: Subject to any disclaimer, the term of this patent is extended or adjusted under 35 U.S.C. 154(b) by 197 days.

(21) Appl. No.: 14/094,837

(22) Filed: Dec. 3, 2013

(65) Prior Publication Data
US 2015/0153215 A1 Jun. 4, 2015

(51) Int. Cl.
*G01F 23/72* (2006.01)
*G01F 23/68* (2006.01)

(52) U.S. Cl.
CPC ............. *G01F 23/72* (2013.01); *G01F 23/68* (2013.01)

(58) Field of Classification Search
CPC .................................. G01F 23/72; G01F 23/68
See application file for complete search history.

(56) References Cited

U.S. PATENT DOCUMENTS

| 3,921,461 | A  | * | 11/1975 | Layton    | G01N 9/14  |
|           |    |   |         |           | 73/447     |
| 4,454,761 | A  | * | 6/1984  | Coulange  | G01F 23/68 |
|           |    |   |         |           | 73/305     |
| 6,218,949 | B1 | * | 4/2001  | Issachar  | G01F 23/62 |
|           |    |   |         |           | 340/603    |
| 8,416,090 | B2 |   | 4/2013  | Bucciero  |            |
| 2011/0271754 | A1 | * | 11/2011 | Ross, Jr. | G01F 23/74 |
|           |    |   |         |           | 73/295     |
| 2013/0146604 | A1 |   | 6/2013 | Moreno et al. |       |

FOREIGN PATENT DOCUMENTS

| EP | 0360444 A1 | 3/1990 |
| EP | 2289729 B1 | 2/2013 |
| WO | 8804031 A1 | 6/1988 |
| WO | 0038498 A1 | 7/2000 |

OTHER PUBLICATIONS

Mraz, Stephen, "Measuring liquid levels with LVDTs", Machine Design, Feb. 23, 2006.*

* cited by examiner

*Primary Examiner* — Paul West
(74) *Attorney, Agent, or Firm* — BainwoodHuang

(57) ABSTRACT

A level sensing device is disclosed that provides a lightweight but robust design and incorporates the use of an LVDT to determine the level of a fluid in a container.

14 Claims, 2 Drawing Sheets

LEVEL SENSING DEVICE

TECHNICAL FIELD

The present disclosure relates generally to apparatus, systems and methods for sensing the level of a fluid in a container. In particular, the present disclosure relates to apparatus, systems and methods for sensing the level of a fluid in a container through the use of a linear variable differential transformer (LVDT).

BACKGROUND

Digital fluid level transducer/senders that are both rugged and lightweight could be used in fuel tanks for unmanned aircraft. Transducers capable of sustaining loads induced by launch, flight and landing are currently of an analog design, which imparts additional equipment needs on the system.

Digital transducers currently on the market are long, fragile instruments best suited for the lab or static tank environment with large spaces available for the bulky converters/senders mounted to the end of the instrument and external to the tank.

Linear variable differential transformers (LVDT), available with digital outputs, initially existed only in laboratories for positional measurement; however their robustness and capacity for surviving shock loads allowed their use in the field.

LVDTs, unfortunately, have been designed around a static LVDT transducer with a translating core. This design results in a product whose overall extended length is at least twice that which is to be measured. The volume to accommodate this length is not a luxury available within the unmanned aircraft structure.

Therefore, a digital level sensing apparatus is needed that can meet the size and weight constraints of an unmanned aircraft that is rugged enough to withstand this challenging environment.

DETAILED DESCRIPTION OF INVENTION

Embodiments in accordance with the present disclosure are set forth in the following text to provide a thorough understanding and enabling description of a number of particular embodiments. Numerous specific details of various embodiments are described below with reference to level sensing devices for fluids in a container, but embodiments can be used with other features. In some instances, well-known structures or operations are not shown, or are not described in detail to avoid obscuring aspects of the inventive subject matter associated with the accompanying disclosure. For example, an LVDT is a well known electrical component requiring specific electrical interfaces. A person skilled in the art will understand, however, that the invention may have additional embodiments, or that the invention may be practiced without one or more of the specific details of the embodiments as shown and described.

Figure 1:
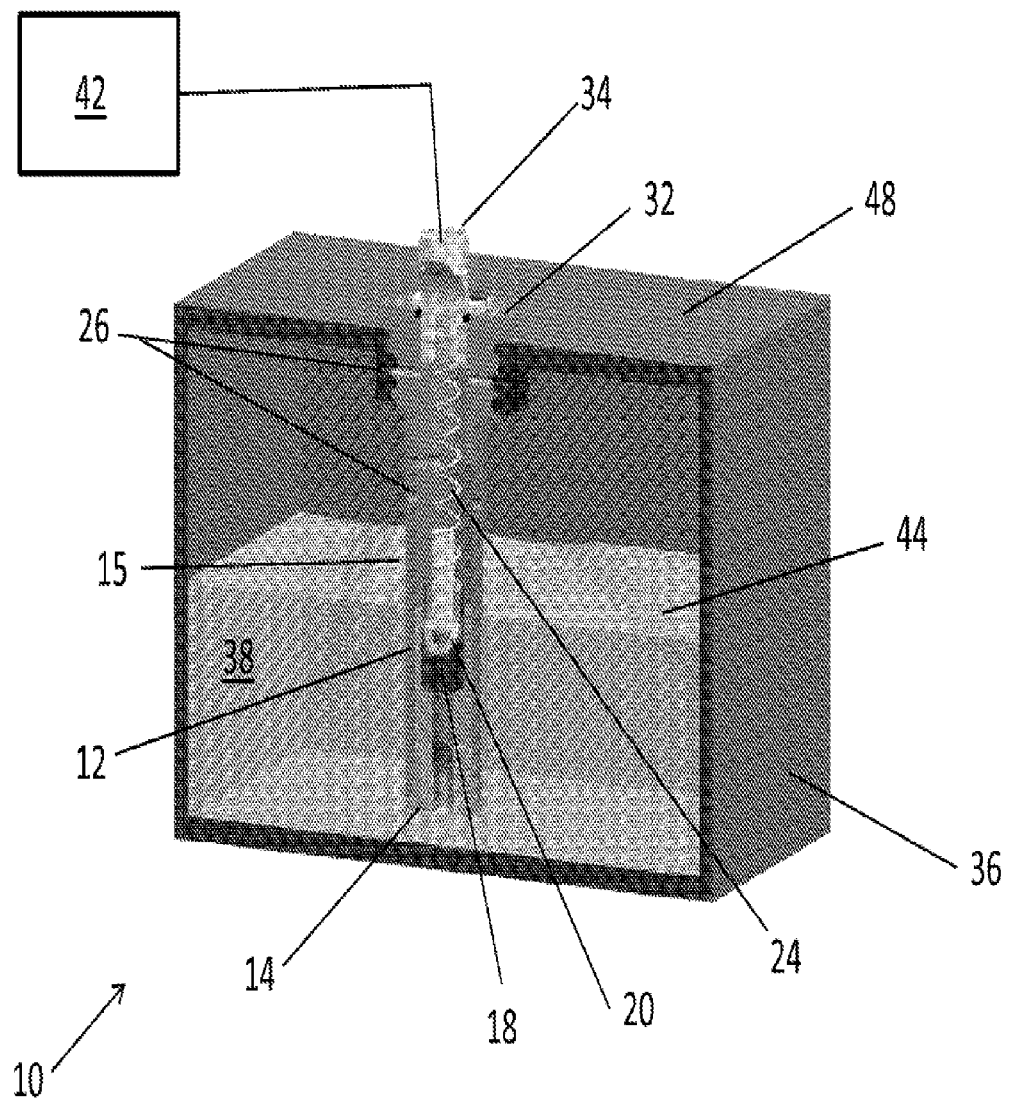
FIG. 1 is a sectional plan view showing an embodiment of a level sensing apparatus installed in a representative tank with fluid.
Figure 2:
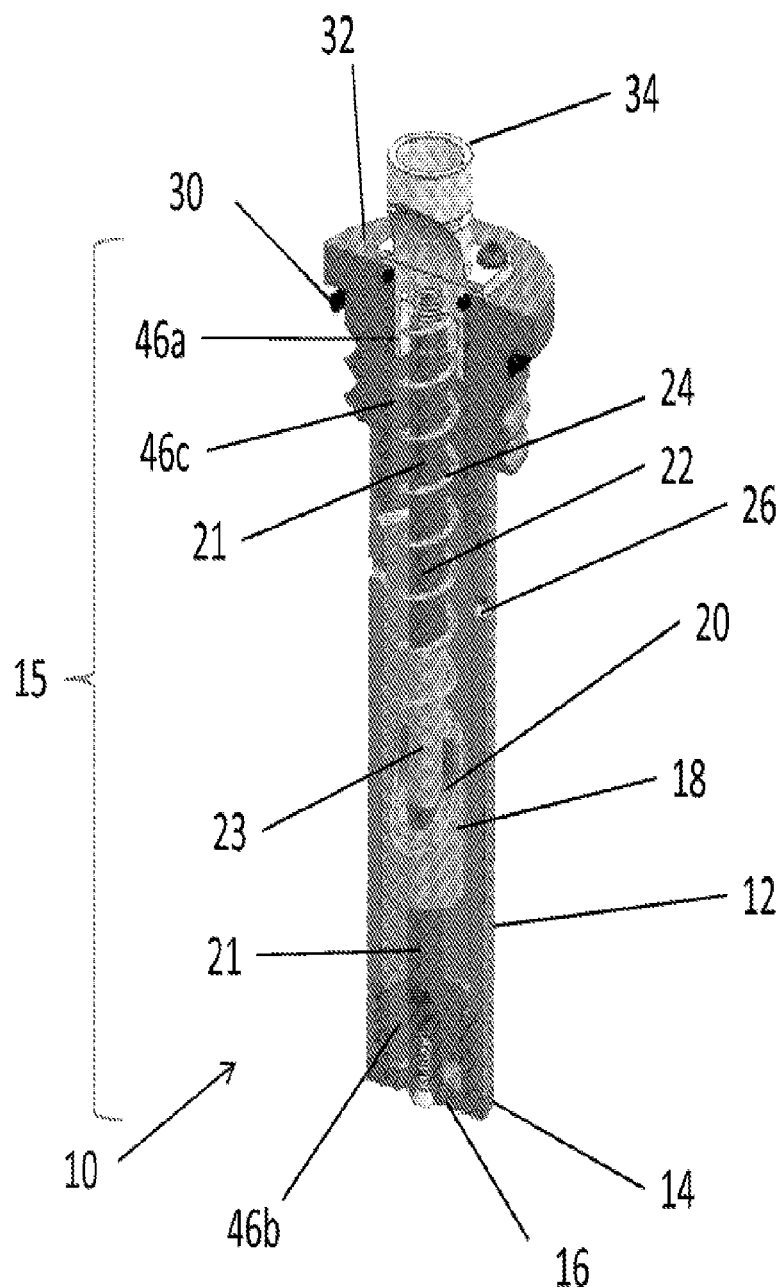
FIG. 2 is a sectional plan view showing an embodiment of a level sensing apparatus.

Referring to FIGS. 1 and 2, a level sensing device 10 is disposed in a container 36 and an LVDT 20 is encased in a float casing 18 using materials compatible with and sized appropriately for the medium being measured such that the LVDT 20 resides at a relatively constant level with respect to a fluid level 44 whether a fluid 38 be ascending, descending or constant.

The LVDT 20 translates slidably upon a core rod assembly 22, consisting of a core 23 and connecting rods 21 fixedly attached to either side of the core rod 22. The connecting rods 21 may be of any non-magnetic material, such as plastic, ceramic, composite or metal, though most often it is of a 300-series stainless steel. The core rod assembly 22 is fixedly attached to and aligned by a top cap 32 and a bottom cap 14. The top cap 32 and the bottom cap 14 are aligned by and fixedly attached to an outer casing 12. The top cap 32 and the bottom cap 14 possess mating features to fixedly attach the core rod assembly 22, connector 34 and casing 12. The envelope created by the fixing of caps to either end of the casing shall be referred to hereafter as a housing 15.

As the LVDT 20 generates signals associated with its position and translation, leads (wires) 24 extend from the LVDT for the purpose of connecting to an external measuring system 42, thereby transmitting and communicating these signals. The non-limiting arrangement and shape of these leads 24 may include wires stretched in a linear, sine wave, braided or other manner.

For this embodiment, the preferred, non-limiting, arrangement are wires 24, flexibly attached to the LVDT 20, coiled about the core rod assembly 22 in a helical (spring-like) manner to reduce stresses on the wires 24 in order to limit or eliminate fatigue and breakage of the wires 24 through continuous movement during operation. These wires 24 may extend from one or both ends of the LVDT 20, each subsequently terminating flexibly at the top cap 32 or bottom cap 14 or both.

An electrical connector 34 may be fixedly attached to the top cap 32 to receive the leads 24 from the LVDT 20. This connector 34 allows electrical continuity and the conveyance of the electrical signals from the LVDT 20 to external components 42 through the top cap 32 while providing a means of disconnecting from said components for removal from the system as a whole for repair or replacement.

Another, non-limiting implementation, would be a sealed pass through feature in the top cap 32, allowing the LVDT leads 24 to exit the internal chamber without allowing the measured medium (fluid) 38 from escaping from the container 36. These leads 24 are typically terminated to the external measuring system 42 in a permanent (i.e.: soldered) or temporary (i.e. screw terminal) manner.

One or both caps may possess mounting features which allow the device as a whole to be attached to a bracket, tank wall or other non-limited object on one or both ends. The top cap 32 and the bottom cap 14 may contain a cavity feature 46a, 46c and 46b respectively sized in a manner to receive a partial length or the whole of the LVDT float 18 or leads 24 so as not to limit the total desired translation of the LVDT float 18.

Additionally, the top cap 32 may possess one or more non-limited sealing features, such as gaskets and o-rings 30, so as to limit or eliminate the propagation of the medium being measured through the device to a volume exterior.

The casing 12, tubular in manner, encompasses the float 18 and core rod assembly 22 for durability, protection and stability of the LVDT 20, core rod assembly 22 and internal electrical components. The float 18 may or may not slidably engage the casing 12.

The caps 32 and 14, the casing 12 or both may possess openings 16 and 26 to allow the passage of fluid to and from the exterior to the interior of the housing 15. These openings are non-limited in shape, size and position. A filter material (not shown) may be placed in the openings 16 and 26.

The geometric features of the openings 16 and 26 in combination with the density or porosity of the filter material, if present, may be altered to provide rapid fluctuation, damped response or other dynamic conditions to the fluid contained within the housing 15, thereby affecting the response of the LVDT 20.

All attachments are to be considered non-limiting and may be temporary (i.e.: screw threads) or permanent (i.e.: welded).

The caps 14 and 32, casing 12 and connectors 34 may be of any suitable material, such as plastic, elastomeric, ceramic, composite or metal. The components are not restricted to any particular geometrical shape, though items of a circular cross section are typically chosen for their ease of manufacture.

This invention may be utilized in any system requiring a digital interface with a vessel containing fluid whose level must be known at predetermined intervals or at all times. Fluid, as used herein, refers to a liquid and gaseous liquids are referred to as air or vapor.

The level sensing device 10 may be attached to the vessel body through either the top cap 32 or the top and bottom cap 14, depending upon whether or not a sump exists within the vessel and measurement of the fluid level within the sump is desired. The following description exemplifies a typical installation of this invention within an unmanned aerial vehicles' fuel tank, inclusive of a sump whose level is not a required output.

The level sensing device 10 is attached to a top surface 48 of the container or fuel tank 36 either through a series of bolts around a mounting flange feature on the top cap 32 or with a nut applied to threads of the top cap 32 from the inside of the tank 36 such that the tank's skin is sandwiched between the nut and the top cap 32 flange. In both instances, a seal will be present between the top surface 48 and the top cap 32 so as to prevent migration of fluid from inside of the tank to the outside environment.

With this installation, the case 12, whose length is determined by the range of fluid levels desired to be measured, with all internal features and components, is within the tank and in contact with the tank's fluid 38 when the fluid is within the range desired to be measured. The electrical connector 34 is external to the tank 36 in this same installation, such that the external system 42, such as, but not limited to, a computer, avionics, simple relays or visual indicators, may be attached via a mating connector and harness/cable/wire arrangement.

When installed, and the tank's fluid level 44 is below the desired measurement range, the fluid 38 is not in contact with the LVDT 20, which now rests at the bottom of the case 12 on the bottom cap 14, with the electrical leads 24 at their greatest extension.

As the fluid level 44 within the tank 36 rises and approaches a level to be measured, the fluid enters the case 12 through the holes 16 in the bottom cap 14. As the fluid level 44 rises, air or vapor present in the case 12 exits through the holes 26 in the case 12. The fluid level at which time the float 18 achieves neutral buoyancy is considered the lowest point of the measurable fluid level range.

As the float 18 has been designed to buoyantly support the LVDT 20 and electrical lead 24 weight upon the fluid being measured, the float 18 and LVDT 20 begins translating along the core rod assembly 22. As the LVDT 20 approaches and subsequently passes the core 23, the digital signal generated by the LVDT 20 varies. This signal, communicated by the electrical leads 24 to the electrical connector 34 external interface, is utilized by the external system 42 as needed.

At the top end of the fluid level range, the float 18 is disposed within the cavity feature 46c of the top cap 32, as do the compressed electrical leads 24, such that the fluid within the tank may measured accurately to the upper surface of the tank. The electrical leads 24 may also compress into an additional pocket 46a in the connector if so designed.

The rate at which the float 18 rises with the fluid level 44 may be regulated by the quantity and sizes of the holes 16 in the bottom cap 14, and any vents 26 in the case 12 and the top cap 32 or a combination of all mentioned. This may be implemented such that fluid level may be measured more accurately or at a slower rate of change when the fluid level external to the case 12 changes abruptly, either local to the case 12 or within the tank 36, such as caused by fluid sloshing or momentary flow from one side of the tank to another, which is typical during attitude changes of an aircraft.

The invention claimed is:

1. A level sensing device for detecting the level of a fluid in a container comprising:
    a core rod assembly extending into the fluid, said core rod assembly comprised of a core and connecting rods such that said core is disposed in a fixed location along the longitudinal axis of said core rod assembly,
    a linear variable differential transformer (LVDT) configured to float on the surface of the fluid as the fluid level rises and falls in the container, said LVDT in communication with said core to provide an electrical signal that is representative of the level of the fluid in the container, and
    electrical lead wires disposed on said LVDT, said electrical lead wires being in communication with an external measuring system for reporting the level of the fluid,
    wherein said level sensing device further comprises a porous housing that contains said core rod assembly and said LVDT and that maintains the core rod assembly in a fixed location along a longitudinal axis of said level sensing device, said porous housing including an adapter for fixedly attaching the level sensing device to a container.

2. The level sensing device of claim 1 wherein the level sensing device is removably disposed on the container.

3. The level sensing device of claim 1 wherein said electrical lead wires are wrapped in a spiral fashion along a longitudinal axis of said core rod assembly.

4. The level sensing device of claim 1 further comprising an electrical connector disposed on the level sensing device and in electrical communication with said electrical lead wires.

5. The level sensing device of claim 1 further comprising a casing disposed external to and coaxially along the longitudinal axis of said core rod assembly, said casing defining an internal volume for the fluid to collect.

6. The level sensing device of claim 1, further comprising a float casing that encases the LVDT within a floating material.

7. The level sensing device of claim 6, wherein said float casing is disposed concentrically around said core rod assembly and is configured to translate slidably upon said core rod assembly along the longitudinal axis of said core rod assembly.

8. The level sensing device of claim 7, wherein said housing includes a casing, a first cap attached to a first end of the casing, and a second cap attached to a second end of the casing.

9. The level sensing device of claim 8, wherein at least one of the first cap and the second cap includes a cavity feature constructed and arranged to receive at least a portion of the float casing.

10. A level sensing device for detecting the level of a fluid in a container comprising:
- an elongated housing removably affixed to the container and extending into the interior volume of the container,
- a core rod assembly disposed along an internal longitudinal axis of said housing, said core rod assembly comprised of a core and connecting rods such that said core is disposed in a fixed location in the container,
- a linear variable differential transformer (LVDT) configured to float on the surface of the fluid as the fluid level rises and falls in the container, said LVDT slidably disposed on said core rod assembly, said LVDT being in communication with said core to provide an electrical signal that is representative of the level of the fluid in the container,
- electrical lead wires disposed on said LVDT, said electrical lead wires being in communication with an external measuring system for reporting the level of the fluid.

11. The level sensing device of claim 10 wherein the level sensing device is removably disposed on the container.

12. The level sensing device of claim 10 wherein said electrical lead wires are wrapped in a spiral fashion along a longitudinal axis of said core rod assembly.

13. The level sensing device of claim 10 further comprising an electrical connector disposed on the level sensing device and in electrical communication with said electrical lead wires.

14. The level sensing device of claim 10 further comprising a casing disposed external to and coaxially along the longitudinal axis of said core rod assembly, said casing defining an internal volume for the fluid to collect.

* * * * *